United States Patent
Forster

(10) Patent No.: US 10,395,071 B2
(45) Date of Patent: Aug. 27, 2019

(54) CONTROL OF RFID READER EMISSIONS WHICH MAY CAUSE INTERFERENCE WITH SYSTEMS USING RFID TAGS

(71) Applicant: Avery Dennison Retail Information Services, LLC, Westborough, MA (US)

(72) Inventor: Ian J. Forster, Chelmsford (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 115 days.

(21) Appl. No.: 15/366,804

(22) Filed: Dec. 1, 2016

(65) Prior Publication Data
US 2018/0157872 A1    Jun. 7, 2018

(51) Int. Cl.
G06K 7/00      (2006.01)
G06K 7/10      (2006.01)
G06K 19/07    (2006.01)

(52) U.S. Cl.
CPC ....... *G06K 7/10019* (2013.01); *G06K 7/0008* (2013.01); *G06K 7/10128* (2013.01); *G06K 7/10198* (2013.01); *G06K 7/10217* (2013.01); *G06K 19/0723* (2013.01)

(58) Field of Classification Search
CPC ........... G06K 7/10019; G06K 19/0723; G06K 19/073; G06K 19/07345; G06K 19/07756; G06K 19/07767; G06K 7/0008; G06K 17/0029; G06K 7/10198; G06K 7/10217; G06K 7/10128; G06K 7/10009; G06K 19/0776
USPC .............................................. 340/10.2, 572.7
See application file for complete search history.

(56) References Cited

U.S. PATENT DOCUMENTS

| | | |
|---|---|---|
| 6,150,948 A | 11/2000 | Watkins |
| 2002/0032435 A1 | 3/2002 | Levin |
| 2002/0070862 A1 | 6/2002 | Sheehan et al. |
| 2004/0178912 A1 | 9/2004 | Smith et al. |

(Continued)

FOREIGN PATENT DOCUMENTS

| | | |
|---|---|---|
| CA | 2594074 | 1/2009 |
| CN | 201134107 | 10/2008 |

(Continued)

OTHER PUBLICATIONS

International Search Report and Written Opinion Prepared for PCT/US2017/063530 dated Mar. 5, 2018.

*Primary Examiner* — Andrew W Bee
(74) *Attorney, Agent, or Firm* — Avery Dennison Retail Information Services, LLC

(57) ABSTRACT

Methods and systems are provided for controlling an RFID emission within an environment including a sensitive object whose operation may be affected by RFID emissions above a particular strength. An RFID reader of the system is configured to emit a reader signal, while a host is associated with the RFID reader and configured to define the strength of the reader signal. A guard tag is configured to receive the reader signal and, upon receiving the reader signal, emit a return signal to be received by the RFID reader. The host is further configured to, upon the RFID reader receiving the return signal, decrease the strength of the reader signal and/or change the direction in which the reader signal is emitted, preferably until no further reader signal is received by the RFID reader.

20 Claims, 1 Drawing Sheet

(56) References Cited

U.S. PATENT DOCUMENTS

| | | |
|---|---|---|
| 2005/0109845 A1 | 5/2005 | Ghaffari |
| 2006/0049249 A1 | 3/2006 | Sullivan |
| 2006/0066441 A1 | 3/2006 | Bridgelall et al. |
| 2006/0066453 A1 | 3/2006 | Homanfar et al. |
| 2006/0197652 A1 | 9/2006 | Reason et al. |
| 2007/0229278 A1* | 10/2007 | Nagata ............... G06K 19/0723 340/572.7 |
| 2008/0100439 A1 | 5/2008 | Rinkes |
| 2008/0191843 A1 | 8/2008 | Strzelczyk |
| 2008/0191845 A1 | 8/2008 | Strzelczyk |
| 2009/0021351 A1 | 1/2009 | Matsumoto et al. |
| 2009/0231142 A1 | 9/2009 | Nikitin et al. |
| 2009/0243801 A1 | 10/2009 | Strzelczyk |
| 2009/0303047 A1 | 12/2009 | Rinkes |
| 2009/0309704 A1 | 12/2009 | Chang et al. |
| 2010/0123547 A1 | 5/2010 | Stevenson et al. |
| 2010/0127828 A1 | 5/2010 | Duron et al. |
| 2010/0314452 A1 | 12/2010 | Mo et al. |
| 2011/0169608 A1 | 7/2011 | Sailor et al. |
| 2011/0266342 A1* | 11/2011 | Forster ................ G06K 7/0008 235/385 |
| 2012/0229258 A1 | 9/2012 | Liu et al. |
| 2012/0235817 A1* | 9/2012 | Forster ................ G06K 7/0008 340/572.1 |
| 2013/0120119 A1 | 5/2013 | Calvarese |
| 2013/0193207 A1 | 8/2013 | Littlechild et al. |
| 2013/0222119 A1 | 8/2013 | Paeschke et al. |
| 2013/0278386 A1 | 10/2013 | Zumsteg |
| 2016/0034724 A1 | 2/2016 | Zumsteg |

FOREIGN PATENT DOCUMENTS

| | | |
|---|---|---|
| CN | 103413110 | 11/2013 |
| CN | 104765016 | 7/2015 |
| EP | 1880330 | 1/2008 |
| JP | 2010165150 | 7/2010 |
| JP | 2014189361 | 10/2014 |
| KR | 100743088 | 7/2007 |
| WO | 2011015511 | 2/2011 |

* cited by examiner

CONTROL OF RFID READER EMISSIONS WHICH MAY CAUSE INTERFERENCE WITH SYSTEMS USING RFID TAGS

BACKGROUND

Field of the Disclosure

The present subject matter relates to radio frequency identification ("RFID") devices. More particularly, the present subject matter relates to systems and methods for preventing emissions from an RFID reader that would interfere with the operation of sensitive objects in the vicinity of the RFID reader.

Description of Related Art

RFID tags are widely used to associate an object with an identification code. The RFID tag is provided in combination with an RFID reader that sends signals to and receives signals from any RFID tags within the read field of the RFID reader.

Occasionally, the operation of objects within the read field may be affected by signals transmitted by the RFID reader. For example, medical devices and sensitive radio receivers are generally designed to be tolerant of RF signals up to a defined field strength at a given frequency. However, at greater field strengths, there is the potential for some form of interference, which may degrade the operation of the object within the field.

The present disclosure recognizes that it may be advantageous or necessary for the RFID reader to continue operating, for example, to track equipment or personnel and/or to perform other functions, so removing the RFID reader from the environment may not be an option. Accordingly, the present disclosure provides systems and methods of controlling the emissions of an RFID reader as necessary to allow for the proper operation for sensitive objects within the vicinity of the RFID reader, realizing important advantages.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a system is provided for controlling an RFID emission within an environment including a sensitive object. The system includes an RFID reader configured to emit a reader signal. A host is associated with the RFID reader and configured to define a signal strength of the reader signal. A guard tag is configured to receive the reader signal and, upon receiving the reader signal, emit a return signal to be received by the RFID reader. The host is further configured to, upon the RFID reader receiving the return signal, decrease the signal strength and/or change the direction in which the reader signal is emitted.

In a further aspect, a system is provided for controlling an RFID emission within an environment including a sensitive object. The system includes an RFID reader configured to emit a reader signal. A host is associated with the RFID reader and configured to define a signal strength of the reader signal. A guard tag is configured to receive the reader signal and, upon receiving the reader signal, emit a return signal to be received by the RFID reader. The host is further configured to, upon the RFID reader receiving the return signal, decrease the signal strength and/or change the direction in which the reader signal is emitted until the return signal from is no longer received by the RFID reader. When desired, upon the reader receiving no return signal, the host is configured to periodically increase signal strength until the return signal is again received by the RFID reader. As a further feature of the combination when desired, the host is additionally configured to decrease signal strength, upon the return signal being again received by the reader, until the return signal is again received by the RFID reader.

In an additional aspect, a system is provided for controlling an RFID emission within an environment including a sensitive object. The system includes an RFID reader configured to emit a reader signal. A host is associated with the RFID reader and configured to define a signal strength of the reader signal. A plurality of guard tags are configured to receive the reader signal and, upon receiving the reader signal, emit a return signal to be received by the RFID reader. The host is further configured to, upon the RFID reader receiving a return signal from one or more of the plurality of guard tags, decrease the signal strength and/or change the direction in which the reader signal is emitted, and the host is configured to adjust reader operation until the RFID reader receives return signals from none of the plurality of guard tags.

In an added aspect, a system is provided for controlling an RFID emission within an environment including a sensitive object. The system includes an RFID reader configured to emit a reader signal and to be moved within an environment. A host is associated with the RFID reader and configured to define a signal strength of the reader signal. A guard tag is configured to receive the reader signal and, upon receiving the reader signal, emit a return signal to be received by the RFID reader. The host is further configured to, upon the RFID reader receiving the return signal, decrease the signal strength and/or change the direction in which the reader signal is emitted.

In one aspect, a system is provided for controlling an RFID emission within an environment including a sensitive object. The system includes an RFID reader configured to emit a reader signal and a second signal in different directions. A host is associated with the RFID reader and configured to define a signal strength of the reader signal and of the second signal. A guard tag is configured to receive either or both of the signals and, upon receiving one or both signals, emit a return signal to be received by the RFID reader. The host is further configured to, upon the RFID reader receiving the return signal, decrease the signal strength and/or change the direction in which the signal or signals received by the guard tag is emitted without decreasing the signal strength or changing the direction of emission of any signal from the RFID reader that was not received by the guard tag.

According to a further aspect, a system is provided for controlling an RFID emission within an environment including a sensitive object. The system includes an RFID reader configured to emit a reader signal. A host is associated with the RFID reader and configured to define a signal strength of the reader signal. One or more guard tags having a sensor are mounted to the sensitive object and are configured to receive the reader signal and, upon receiving the reader signal, emit a return signal to be received by the RFID reader. The host is further configured to, upon the RFID reader receiving the return signal, decrease the signal strength and/or change the direction in which the reader signal is emitted. The system is configured such that, if the sensor determines the sensitive object is inactive, the return signal is modified to prevent the host from decreasing signal strength and/or changing the direction of reader signal emittance upon the RFID reader receiving the return signal.

In another aspect, a method is provided for controlling an RFID emission within an environment including a sensitive object. The method includes emitting a reader signal having a signal strength. When the reader signal is received, a return signal is emitted. The return signal is received and the signal strength is decreased and/or the direction in which the reader signal is emitted is changed.

In a further aspect, a method is provided for controlling an RFID emission within an environment including a sensitive object. The method includes emitting a reader signal having a signal strength. When the reader signal is received, a return signal is emitted. The return signal is received and the signal strength is decreased and/or the direction in which the reader signal is emitted is changed, which when desired can include decreasing the signal strength and/or changing the direction in which the reader signal is emitted until the return signal is no longer received. A plurality of reception locations for the reader signal can be included when desired, wherein the signal strength is decreased and/or the direction in which the reader signal is emitted is/are changed until no return signals are received. Optionally, upon no longer receiving the return signal, the method can include periodically increasing the signal strength until the return signal is again received, which can be followed by decreasing the signal strength until the return signal is no longer received.

In an additional aspect, a method is provided for controlling an RFID emission within an environment including a sensitive object. The method includes emitting a reader signal having a signal strength. When the reader signal is received, a return signal is emitted. The return signal is received and the signal strength is decreased and/or the direction in which the reader signal is emitted is changed. The reader signal is configured to be emitted at the same location as the return signal, which location may be moved in the environment.

In another aspect, a method is provided for controlling an RFID emission within an environment including a sensitive object. The method includes emitting a reader signal and a second signal in different directions, with each signal having a signal strength. When at least one of the signals is received, a return signal is emitted. The return signal is received and the strength of whichever of the reader signal and/or the second signal was received is decreased and/or the direction in which that signal is emitted is changed without changing the emission direction or decreasing the strength of any signal that was not received.

In another aspect, a method is provided for controlling an RFID emission within an environment including a sensitive object. The method includes emitting a reader signal having a signal strength. When the reader signal is received, a return signal is emitted. The return signal is received and the signal strength is decreased and/or the direction in which the reader signal is emitted is changed. Receiving the reader signal and emitting the return signal include receiving the reader signal at one or more surfaces of the sensitive object. When desired, it is determined whether the sensitive object is inactive and, if so, the signal strength is prevented from being decreased upon receiving the return signal and/or the direction in which the reader signal is emitted is prevented from being changed.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
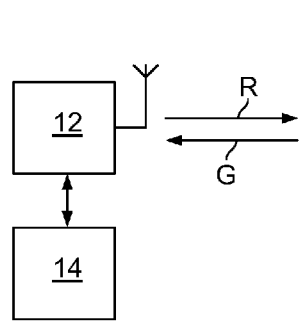
FIG. 1 is a diagrammatic view of an exemplary system of controlling the emissions of an RFID reader to prevent interference with a sensitive object within the read field of the RFID reader.

FIG. 1 shows an exemplary system or embodiment for controlling an RFID emission within an environment including a sensitive object 10. As used herein, the phrase "sensitive object" refers to a device that is tolerant of RF signals up to a defined field strength, with there being the potential for the proper operation of the device being interfered with in the presence of a stronger RF field. The term "sensitive object" is not intended to refer to any particular electronic device, but may include medical devices and sensitive radio receivers.

The system of FIG. 1 includes an RFID reader 12 associated with a host 14, both of which may be variously configured without departing from the scope of the present disclosure. It is also within the scope of the present disclosure for the system to include additional sources of RFID emissions, such as a second RFID reader.

The RFID reader 12 is configured to emit a reader signal (generally identified in FIG. 1 at R) that defines an RF field in which the sensitive object 10 may be present. The reader signal R has a given power or signal strength, which is defined by the host 14, and is emitted by the RFID reader 12 to attempt to read any RFID tags or devices within its range. Reference number 16 identifies one such RFID tag that communicates with the RFID reader 12 if it is within range of the reader signal R (i.e., if it is within the RF field). The RFID tag 16 may be variously configured without departing from the scope of the present disclosure. While FIG. 1 illustrates only one RFID tag 16, it should be understood that systems according to the present disclosure may include a plurality of RFID tags, as will be described in greater detail.

The RFID tag 16 is referred to herein as a guard tag, because it functions to guard against RFID emissions from the RFID reader 12 (or from any other source within range of the guard tag 16) interfering with proper operation of the sensitive object 10. In particular, the guard tag 16 is associated with the sensitive object 10 (e.g., by being mounted to the sensitive object 10 or being placed in the immediate vicinity of the sensitive object 10), preferably in such a way that any RFID emissions from the RFID reader 12 that would be received by the sensitive object 10 are also received by the guard tag 16. The guard tag 16 is encoded in such a way that, upon receiving a reader signal R having a given strength (which may be the maximum field strength to which the sensitive object 10 is to be exposed or some other value), it responds back to the RFID reader 12 with a return signal G.

When the RFID reader 12 receives the return signal G from the guard tag 16, the host 14 decreases the signal strength of the reader signal R. The magnitude of the change in signal strength of the reader signal R may be a product of one or more factors. For example, the host 14 may be programmed to decrease the signal strength by a preselected or predetermined increment each time a return signal G is received. Alternatively, the host 14 may be programmed to decrease the signal strength by an amount that may vary, which amount may depend upon the nature of the particular return signal G that is received by the RFID reader 12.

The RFID reader 12 continues emitting the reader signal R, but at the new, lower signal strength. If the reader signal R is again received by the guard tag 16, the guard signal will again respond with a return signal G to cause the host 14 to decrease the signal strength of the reader signal R. This process repeats until the RFID reader 12 no longer receives a return signal G from the guard tag 16 (i.e., until the strength of the reader signal R is sufficiently low that it is not received and/or does not elicit a response from the guard tag 16). At this time, the strength of the reader signal R has been reduced to the point that it will not interfere with proper operation of the sensitive object 10.

When the strength of the reader signal R has been reduced to the point that no return signal G is received by the RFID reader 12, the RFID reader 12 may continue emitting a reader signal R having the strength most recently defined by the host 14. Alternatively, rather than continuing to operate at that most recently defined signal strength, the host 14 may instead be programmed to cause the strength of the reader signal R to increase. In particular, the host 14 may cause the strength of the reader signal R to periodically increase until a return signal G is received from one or more guard tags 16. When at least one return signal G has been received by the RFID reader 12, the host 14 may again cause the strength of the reader signal R to decrease until no return signals R are received by the RFID reader 12, as described above. This may be advantageous by allowing the host 14 to test whether it is suitable for the strength of the RF field to increase, which may be appropriate if the sensitive object 10 is configured to be moved within the environment and has been (along with the guard tag 16) moved out of the RF field or at least away from the RFID reader 12, for example. Another situation in which it would be appropriate to increase the strength of the reader signal R is when the RFID reader 12 has moved with respect to the sensitive object 10, such as in the case of an RFID reader 12 incorporated into a handheld device. By increasing the strength of the reader signal R, the RFID reader 12 is able to better communicate with other RFID tags in the environment that are performing other functions.

According to an alternative approach, rather than detection of a return signal G causing the host to decrease the strength of the reader signal R, the host 14 may be programmed to take some other action to avoid interference with proper operation of the sensitive object 10. For example, when the RFID reader 12 receives a return signal G, the host 14 may cause the RFID reader 12 to change the direction in which the return signal G is emitted. This allows the reader signal R to continue operating at a strength that could potentially interfere with proper operation of the sensitive object 10 while avoiding such interference by directing the reader signal R away from the sensitive object 10. This approach may be used either alone or in combination with a response from the host 14 that decreases the strength of the reader signal R.

Figure 2:
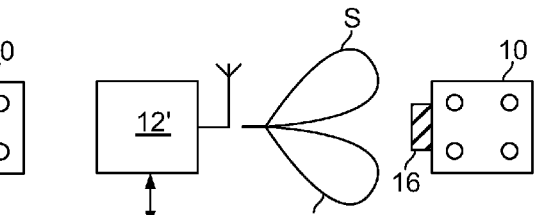
FIG. 2 illustrates a variation of the system of FIG. 1, incorporating an alternative RFID reader.

FIG. 2 illustrates a variation of the system of FIG. 1. In the embodiment of FIG. 2, the RFID reader 12' is configured to emit at least two reader signals R and S in different directions. The host 14' is programmed to discern which reader signal R, S a return signal G from a guard tag 16 is responsive to and decrease the strength and/or change the direction of only that reader signal R, S, without decreasing the strength and/or direction of a reader signal R, S that has not elicited a return signal G. Such a configuration allows for the overall strength of the RF field to be increased without interfering with the operation of any sensitive objects 10 within the RF field.

Figure 3:
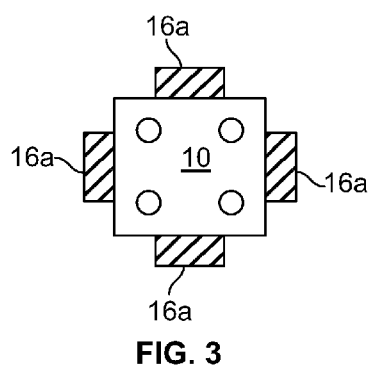
FIG. 3 is a diagrammatic view of a sensitive object with a plurality of guard tags.

FIG. 3 illustrates another embodiment of a system according to the present disclosure, which may incorporate an RFID reader and host (not illustrated in FIG. 3) according to the preceding description of the RFID reader 12 and host 14 of FIG. 1, or of the RFID reader 12' and host 14' of FIG. 2. In the embodiment of FIG. 3, rather than a single guard tag 16 being mounted to or otherwise associated with a sensitive object 10, a plurality of guard tags 16a are mounted to or otherwise associated with the same sensitive object 10. Guard tags 16a can be the same or different from guard tag 16, and guard tags 16a can be the same or different from each other. While FIG. 3 illustrates four guard tags 16a associated with the sensitive object 10, it is within the scope of the present disclosure for any number of guard tags 16a to be associated with an individual sensitive object 10.

Preferably, the various guard tags 16a associated with a single sensitive object 10 are positioned and oriented to encounter RFID emissions approaching the sensitive object 10 in different directions (e.g., reader signals from RFID readers positioned in different locations within the environment). The various guard tags 16a may be identically programmed and configured or, as an example, if the RF susceptibility of the sensitive object 10 is direction-dependent, two or more of the guard tags 16a may be differently programmed and/or configured to guard against RF emissions of differing strengths.

Figure 4:
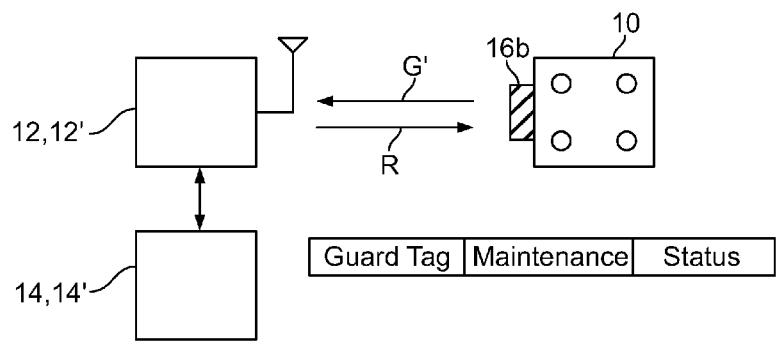
FIG. 4 illustrates a variation of the system of FIG. 1, incorporating an alternative guard tag.

A guard tag 16 or guard tags 16a according to the present disclosure may be variously configured without departing from the scope of the present disclosure. For example, in addition to transmitting a return signal indicating the status of the guard tag 16, 16a as a guard tag, the return signal may include additional information, as in the embodiment of FIG. 4. In FIG. 4, the guard tag 16b is programmed to transmit a return signal G' identifying the guard tag 16b as a guard tag (thereby causing the host 14, 14' to decrease the strength of the reader signal R and/or change the direction of the reader signal R) and also including information about the sensitive object 10 associated with the guard tag 16b. In one embodiment, the return signal G' emitted by the guard tag 16b includes maintenance history, calibration history, and/or asset numbers. The guard tag 16b may also include an additional data element (identified in FIG. 4 as a sensor 18) that is capable of determining whether the associated sensitive object 10 is active or not, which status may be included in the return signal G' emitted by the guard tag 16b. If the return signal G' indicates that the sensitive object 10 is active, then the host 14, 14' may respond to the return signal G' as described above (i.e., by decreasing the strength of the reader signal R and/or changing the direction of the reader signal R). On the other hand, if the return signal G' indicates that the sensitive object 10 is inactive (and, thus, there is no risk of interference from an RFID emission), then the host 14, 14' may refrain from making any change to the reader signal R or make a change that is different from the change made when the sensitive object 10 is active.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof including as combinations of features that are individually disclosed or claimed herein.

The invention claimed is:

1. A system for controlling an RFID emission within an environment including a sensitive object, comprising: an RFID reader configured to emit a reader signal; a host associated with the RFID reader and configured to define a signal strength of the reader signal; and a guard tag configured to receive the reader signal and, upon receiving the reader signal, emit a return signal to be received by the RFID reader, wherein the host is further configured to, upon the RFID reader receiving the return signal, decrease the signal strength and/or change a direction in which the reader signal is emitted; and
wherein the guard tag includes a sensor configured to determine whether the sensitive object is active or inactive and, upon determining that the sensitive object is inactive, modify the return signal to prevent the host from decreasing the signal strength or changing the direction in which the reader signal is emitted upon the RFID reader receiving the return signal.

2. The system of claim 1, wherein the host is configured to decrease the signal strength and/or change the direction in which the reader signal is emitted until the return signal is no longer received by the RFID reader.

3. The system of claim 2, further comprising a plurality of guard tags, wherein the host is configured to adjust the operation of the RFID reader until the RFID reader receives return signals from none of the plurality of guard tags.

4. The system of claim 2, wherein the host is configured to, upon the RFID reader receiving no return signal, periodically increase the signal strength until the return signal is again received by the RFID reader.

5. The system of claim 4, wherein the host is configured to, upon the return signal being again received by the RFID reader, decrease the signal strength until the return signal is no longer received by the RFID reader.

6. The system of claim 1, wherein the RFID reader is configured to be moved within the environment.

7. The system of claim 1, wherein
the RFID reader is configured to emit a second signal in a different direction than the direction in which the reader signal is emitted, and
the host is configured to define a signal strength of the second signal and, upon the RFID reader receiving the return signal, decrease the signal strength of the reader signal and/or changing the direction in which the reader signal is emitted without decreasing the signal strength of the second signal and/or changing the direction in which the second signal is emitted.

8. The system of claim 1, further comprising the sensitive object, wherein the guard tag is mounted to the sensitive object.

9. The system of claim 8, wherein the return signal includes information regarding the sensitive object.

10. The system of claim 1, further comprising a plurality of guard tags and the sensitive object, wherein
the plurality of guard tags are mounted to the sensitive object, and
the host signal is configured to decrease the signal strength and/or change the direction in which the reader signal is emitted upon receiving the return signal from at least one of the plurality of guard tags.

11. A method of controlling an RFID emission within an environment including a sensitive object, comprising:
emitting a reader signal having a signal strength;
receiving the reader signal and emitting a return signal;
receiving the return signal and decreasing the signal strength and/or changing a direction in which the reader signal is emitted; and
determining whether the sensitive object is active or inactive and, upon determining that the sensitive object is inactive, preventing the signal strength from being decreased upon receiving the return signal and/or the direction in which the reader signal is emitted from being changed.

12. The method of claim 11, wherein said receiving the return signal and decreasing the signal strength and/or changing the direction in which the reader signal is emitted includes decreasing the signal strength and/or changing the direction in which the reader signal is emitted until the return signal is no longer received.

13. The method of claim 12, further comprising providing a plurality of locations at which the reader signal may be received, wherein the signal strength is decreased and/or the direction in which the reader signal is emitted is changed until no return signals are received.

14. The method of claim 12, further comprising, upon no longer receiving the return signal, periodically increasing the signal strength until the return signal is again received.

15. The method of claim 14, further comprising, upon again receiving the return signal, decreasing the signal strength until the return signal is no longer received.

16. The method of claim 11, wherein the reader signal is configured to be emitted at the same location as the return signal is received, which location may be moved within the environment.

17. The method of claim 11, further comprising emitting a second signal in a different direction than the direction in which the reader signal is emitted, wherein the signal strength of the reader signal is decreased and/or the direction in which the reader signal is emitted is changed upon receiving the return signal without decreasing a signal strength of the second signal and/or changing the direction in which the second signal is emitted.

18. The method of claim 11, wherein said receiving the reader signal and emitting the return signal includes receiving the reader signal at a surface of the sensitive object.

19. The method of claim 18, wherein the return signal includes information regarding the sensitive object.

20. The method of claim 11, wherein
said receiving the reader signal and emitting the return signal includes receiving the reader signal at at least one of a plurality of surfaces of the sensitive object capable of receiving the reader signal, and said receiving the return signal and decreasing the signal strength includes receiving the return signal from at least one of said plurality of surfaces.

* * * * *